3,334,964
SYNTHESIS OF MORDENITE
Luther J. Reid, Jr., Audubon, N.J., assignor to Mobil Oil
Corporation, a corporation of New York
No Drawing. Filed Oct. 21, 1963, Ser. No. 317,823
7 Claims. (Cl. 23—113)

ABSTRACT OF THE DISCLOSURE

This invention is concerned with a process for synthesizing mordenite which comprises preparing a reaction mixture containing essentially sulfate ions and maintaining said reaction mixture at low temperatures until mordenite crystals are formed.

---

This invention relates to a method of preparing mordenite. More particularly, the invention relates to a method of crystallizing mordenite from reaction mixtures having compositions within specified ranges.

Crystalline aluminosilicates, of which mordenite is an example, in naturally occurring and modified forms have been demonstrated as having catalytic capabilities for hydrocarbon conversion and preferential adsorptive properties for highly selective adsorption.

Such materials exhibit ordered crystalline structures within which are passages, pores or cavities of definite ranges of sizes, characteristic for each variety. Since the dimensions of these pores are such as to accept for adsorption molecules of certain dimensions while rejecting those of larger dimension, these materials have been referred to as "molecular sieves" and utilized in many ways taking advantages of these properties.

Mordenite is a preferred crystalline aluminosilicate product of the method of the present invention. It is a highly siliceous zeolite characterized by an atomic ratio of silicon to aluminum of about 5 to 1. It is naturally occurring, generally as the calcium-potassium-sodium salt, corresponding to the formula:

$$(Na_2,Ca,K_2)O \cdot Al_2O_3 \cdot 10SiO_2 \cdot 6.7H_2O$$

The sodium form has been prepared synthetically and the cations of natural or synthetic mordenite may be exchanged with one or more cations by well known treatment. Cation-exchange, for example, of the initially formed sodium mordenite with H, $NH_4$, Ca, Ba, K, Li, and various other ions serves to vary significantly the channel dimensions thereof. Such exchange technique is described in U.S. Patents 3,140,251, 3,140,252 and 3,140,322, issued July 7, 1964.

The structure of crystalline mordenite is thought to be represented by elliptical channels or pores running parallel along the long crystal axis with smaller channels or pores running transverse to the long axis. The dimensions of the major pores vary considerably, depending upon the cation exchanged with the original mordenite. Natural mordenite, based on adsorption experiments, consists of major channels having free diameters on the order of about 4 to 6.6 A., while the acid form appears to have major channels of a significantly larger diameter, on the order of about 8.1 A. Thus, while original observers found natural mordenite capable of adsorbing only small molecules, such as $O_2$, $N_2$, A, $CH_4$, $C_2H_6$, HCl, $CS_2$, $NH_3$, $CH_3CN$, $CH_3NH_2$ and $CH_3OH$, but not larger molecules such as iso-paraffins and aromatics, it has recently been discovered that acid mordenite can adsorb molecules as large as some aromatics.

Mordenite product prepared by the method of the present invention may be activated by cation exchange to give a product exhibiting improved catalytic or adsorptive properties. One method of preparation is to reduce the original mordenite product to a fine powder and to treat with acid. A specific example of acid treatment is to contact 10 grams of a powdered mordenite passing a 325-mesh sieve with 125 to 200 ml. of 0.1 N HCl for 15 minutes, filter and repeat, then to treat with 125 to 200 ml. of 1.2 N HCl for 15 minutes and repeat (all at room temperature), followed by rinsing until the filtrate shows no acidity. The filter cake, dried at 120° C. and pelleted, yields about 8 grams of acid-exchanged material. Such material exhibits high adsorption and catalytic activity for hydrocarbon conversion.

Heretofore, mordenite has been prepared synthetically from aqueous suspensions of sodium aluminosilicate reaction mixtures at a temperature preferably of 265-295° C. and at a pH of about 8-10.

It is an object of the present invention to prepare mordenite in good yields at a relatively low temperature. It is a specific object of the present invention to prepare synthetic mordenite by crystallization in good yield from reaction mixtures of specified compositions at a temperature significantly lower than that heretofore required for mordenite synthesis.

Other objects and advantages of the present invention will become apparent to those skilled in the art from the following detailed description and examples.

Briefly, the method of the present invention comprises preparing a reaction mixture containing essentially sulfate ions and maintaining said reaction mixture at a temperature below about 200° C. until mordenite crystals are formed. The reaction mixture prepared may be defined in terms of mol ratios as follows:

| | |
|---|---:|
| $Na_2O/SiO_2$ | 0.2–0.5 |
| $SiO_2/Al_2O_3$ | 8–20 |
| $H_2O/Na_2O$ | 60–200 |
| $Na_2SO_4/Al_2O_3$ | 1–8 |

Such reaction mixture generally is characterized by a pH in the approximate range of 11 to 12.5

In a preferred embodiment of the present invention a solution of aluminum sulfate, sodium silicate and sodium hydroxide is prepared to form a reaction mixture of the following range of composition in mole ratios.

| | |
|---|---:|
| $Na_2O/SiO_2$ | 0.2–0.3 |
| $SiO_2/Al_2O_3$ | 10–14 |
| $H_2O/Na_2O$ | 100–125 |
| $Na_2SO_4/Al_2O_3$ | 2–4 |

The resulting mixture is hydrothermally treated at a temperature of about 20 to 200° C., preferably at about 80 to 120° C., until crystals of sodium mordenite form.

The following examples will serve to illustrate the invention without limiting the same:

Examples 1–2

Aluminum sulfate, sodium silicate and sodium hydroxide were mixed in an aqueous solution to form reaction mixtures having the compositions shown in Table I.

TABLE 1

| Ex. | Sodium Silicate Solution,[1] ml. | Al₂(SO₄)₃ Sol'n,[2] ml. | 95% NaOH, gm. | Na₂O/SiO₂ | SiO₂/Al₂O₃ | H₂O/Na₂O | Na₂SO₄/Al₂O₃ |
|---|---|---|---|---|---|---|---|
| 1 | 100 | 224 | 10.4 | 0.2 | 10 | 125 | 3 |
| 2 | 100 | 160 | 10.4 | 0.3 | 14 | 110 | 3 |

[1] Na₂O.3.22 SiO₂, density=1.392 at 60° F.
[2] 9.85 g. Al₂(SO₄)₃ per 100 ml.

The gels were aged at about 32° C. for 48 hours and then treated hydrothermally at 100° C. for 72 days. At the end of such time, an excellent yield of crystalline mordenite was obtained, in each of the above examples.

It will be understood that the above description is merely illustrative of preferred embodiments of the present invention, of which variations may be made by those skilled in the art without departing from the spirit thereof.

I claim:

1. A process for synthesizing mordenite which comprises preparing a reaction mixture having a composition defined in terms of mol ratios as follows:

$Na_2O/SiO_2$ _____ 0.2–0.5
$SiO_2/Al_2O_3$ _____ 8–20
$H_2O/Na_2O$ _____ 60–200
$Na_2SO_4/Al_2O_3$ _____ 1–8 and maintaining said reaction mixture at a temperature below about 200° C. until mordenite crystals are formed.

2. The process as defined in claim 1 wherein the temperature of the reaction mixture is between about 80° C. and about 120° C.

3. The process as defined in claim 1 wherein the reaction mixture is obtained by admixture of aluminum sulfate, sodium silicate and sodium hydroxide.

4. The process for synthesizing mordenite which comprises preparing a reaction mixture having a composition defined in terms of mol ratios as follows:

$Na_2O/SiO_2$ _____ 0.2–0.3
$SiO_2/Al_2O_3$ _____ 10–14
$H_2O/Na_2O$ _____ 100–125
$Na_2SO_4/Al_2O_3$ _____ 2–4 and maintaining said reaction mixture at a temperature between about 20° C. and about 200° C. until mordenite crystals are formed.

5. The process as defined by claim 4 wherein the temperature of the reaction mixture is between about 80° C. and about 120° C.

6. The process as defined by claim 4 wherein the reaction mixture is obtained by admixture of aluminum sulfate, sodium silicate and sodium hydroxide.

7. The process as defined by claim 4 wherein the temperature of the reaction mixture is maintained at about 100° C.

References Cited

UNITED STATES PATENTS

| 1,906,203 | 4/1933 | McAfee | 23—113 |
| 3,248,170 | 4/1966 | Kvetinskas | 23—111 |

FOREIGN PATENTS 626,790   7/1963   Belgium.

OTHER REFERENCES

Barrer "Jr. Chemical Society" 1948, pp. 2158–2163.

OSCAR R. VERTIZ, *Primary Examiner.*

E. J. MEROS, *Examiner.*